United States Patent [19]

MacNeill et al.

[11] 3,812,459

[45] May 21, 1974

[54] OPTICSCAN ARRANGEMENT FOR OPTICAL CHARACTER RECOGNITION SYSTEMS

[75] Inventors: John H. MacNeill; Ronald R. Willey, both of Indialantic, Fla.

[73] Assignee: Optical Business Machines, Inc., Melbourne, Fla.

[22] Filed: Mar. 8, 1972

[21] Appl. No.: 232,893

[52] U.S. Cl. .................... 340/146.3 F, 235/61.11 E

[51] Int. Cl. .................................... G06k 9/10

[58] Field of Search ....... 235/61.11 E; 340/146.3 K, 340/146.3 F

[56] References Cited

UNITED STATES PATENTS

| | | | |
|---|---|---|---|
| 3,222,453 | 12/1965 | Whitesell | 74/55 |
| 3,456,997 | 7/1969 | Stites | 235/61.11 E |
| 3,701,098 | 10/1972 | Acker | 235/61.11 E |
| 3,674,990 | 7/1972 | Kurauchi | 340/146.3 K |

*Primary Examiner*—Paul J. Henon
*Assistant Examiner*—Robert F. Gnuse
*Attorney, Agent, or Firm*—Rose & Edell

[57] ABSTRACT

An optical arrangement for character recognition systems utilizes the same optical path for both illuminating the text and projecting the text onto an array of photosensitive elements. A low power laser beam of cross-section slightly larger than a unit vertical slice of a text character is projected by a prism through a lens arrangement to a scanning mirror which reflects the beam to sequentially illuminate individual text character slices. Each illuminated slice is reflected by the mirror through the lens arrangement onto a linear array of photosensitive elements. The focus of the lens arrangement is varied in synchronization with the mirror scan to correct for changes in the distance between the mirror and text characters at different scan angles. The page is oriented at a slight angle relative to the scan axis of the mirror to eliminate specular reflection. The resultant skew created in the reflected characters as a function of scan angle is compensated for by rotating the photosensitive array about the optical path axis as a function of mirror scan angle.

16 Claims, 6 Drawing Figures

OPTICSCAN ARRANGEMENT FOR OPTICAL CHARACTER RECOGNITION SYSTEMS

BACKGROUND OF THE INVENTION

The present invention relates to optical character recognition systems; more particularly the invention concerns improvements in the optics employed in such systems.

Certain prior art optical character recognition systems illuminate an entire line or portion of a page and then scan each line on the page, character by character. The relatively large illuminated area requires a relatively powerful illumination source. Moreover, the use of a powerful source to illuminate a relatively large portion of the page for a relatively long interval results in excessive heating of the page. A more efficient approach would be to illuminate only a portion of a character at a time, thereby assuring maximum utilization of available light.

Prior art attempts to achieve character recognition by successively illuminating individual characters or character portions have utilized separate optical paths for illumination and reading. Specifically, both paths must simultaneously scan the text characters in synchronism so that the same character is illuminated and read simultaneously. Unfortunately, severe synchronization problems plague this approach, it being extremely difficult to illuminate only a single element of a character while, at the same time, reading that element. In fact, to assure illumination of the character being read, it has been necessary to illuminate an area significantly larger than the character. This gets back to the previously discussed problem involving the requirement for a larger area of illumination.

It is therefore an object of the present invention to provide an improved optical scanning technique for a character recognition system wherein only a single element of a character is illuminated and processed at a time.

It is another object of the present invention to provide an optical scanning arrangement for a character recognition system wherein only a single element at a time is illuminated and processed, yet the number of optical components, the size, the cost and heat dissipation in the system are minimized.

As described in detail hereinbelow, the approach employed in the present invention is to utilize a common optical path to illuminate the text and to project the illuminated character elements onto a linear photosensitive array. This approach has a number of minor problems incident thereto. For example, if a scanning mirror projects a light beam onto a character element and then directly reflects the illuminated element onto the array, the specular reflection from the element tends to glare and thereby mask the character at the array. If the page is tilted relative to the mirror scan axis, however, the projected character elements tend to skew (as a function of scan position) about the optical axis relative to the array. This skewing causes wrong portions of the projected character to impinge upon the photosensitive elements at the array, thereby rendering recognition inaccurate.

It is therefore an object of the present invention to provide an optical scanning arrangement for a character recognition system wherein a common optical path is utilized for character illumination and projection of the illuminated character onto a photosensitive array, and wherein specular reflection is eliminated without impairing the recognition capability of the system.

SUMMARY OF THE INVENTION

In accordance with the principles of the present invention dual optical path synchronization problems are avoided by using a single path for both illuminating and projecting individual elements of characters. Specifically, a lower power laser beam of elongated elliptical cross-section and just slightly larger than a vertical slice or element of a character is projected by a prism through a lens system to a scanning mirror. The mirror sweeps the beam across each successively presented line of a document page, the page being tilted slightly relative to the mirror scan axis to eliminate specular reflection back through the optical system. The mirror also serves to reflect the illuminated character back through the lens arrangement to a linear array of photosensitive elements at which location electronic recognition processing commences. The character skew relative to the array, which results from the tilting of the page and which is a function of scan angle, is compensated for by rotating the array about the optical path axis as a function of mirror scan angle. The theoretically correct angle of array rotation is reduced slightly to assure that the reflected illuminated area, which itself does not become skewed during scanning, always extends over the entire array. In addition, the focal length of the lens is varied as a function of mirror scan angle to compensate for the change in distance between the mirror and successive characters during scanning.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF PREFERRED EMBODIMENTS

Figures 1, 2, 3:
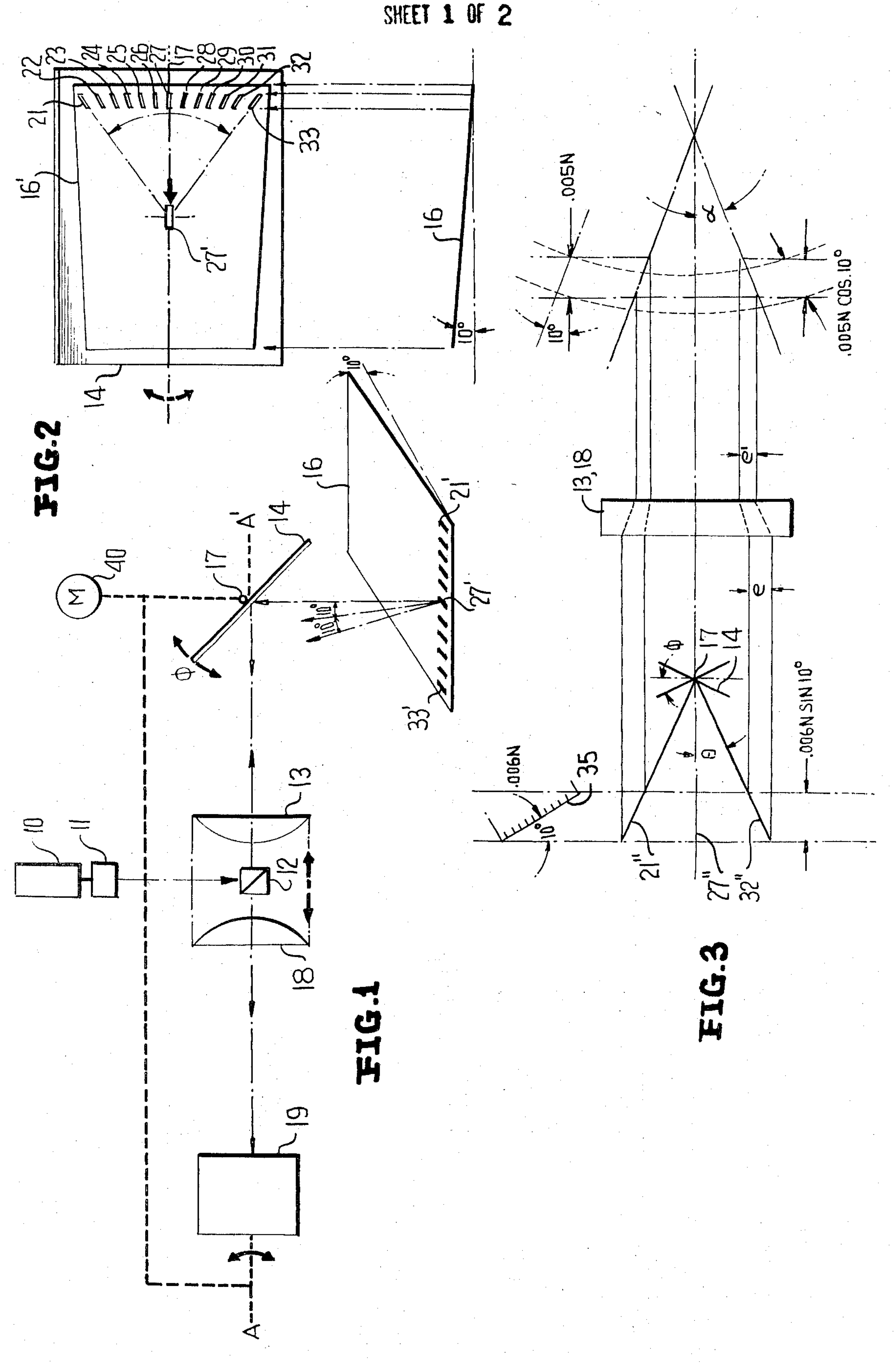
FIG. 1 is a schematic diagram of an optical arrangement according to the present invention.
FIG. 2 is a diagrammatic illustration of the optical character skew created by virtue of tilting the document page in FIG. 1.
FIG. 3 is a diagram illustrating the computation of the required angular rotation for the array of FIG. 1, in order to compensate for the optical character skew.

Referring in detail to FIG. 1 of the accompanying drawing, an optical arrangement for a character reading or recognition system includes a low power laser 10 for emitting a well-defined light beam. Such a laser may be of the helium-neon type with typically a 5 milliwatt rating. The laser beam is passed through a lens system 11 which includes a cylindrical lens to rearrange the generally circular beam cross-section into an elongated elliptical configuration. This beam is then passed to prism 12 where it is reflected to travel along optical axis A-A'. The reflected beam then passes through a condensing lens 13 toward scanning mirror 14 which reflects the beam toward a document page 16 from which characters are being read by the system.

Mirror 14 includes a flat reflecting surface which is caused to rotate about an axis 17 oriented perpendicular to axis A-A' and extending into the plane of the drawing in FIG. 1. Scan drive for the mirror is effected by a mechanical drive arrangement described in detail below in reference to FIG. 6. The scanning motion of mirror 14 causes the reflected laser beam to scan across whichever line of characters on the document page is positioned in predetermined registration with the mirror. The system also includes means (not shown) for sequentially stepping the page to successively bring each line of characters into registration with the scanning mirror, in a manner well-known in the art, so that each line may be scanned in sequence.

The cross-sectional dimensions of the beam are chosen such that the scanning illuminated area on document page 16 is slightly larger than the predetermined height and width of a vertical slice or element of the character being scanned. For example, for the standard OCR-A font, the beam emitted from lens arrangement 11 is approximately 0.020 inch wide and ½ inch long as projected onto document 16. Additional description of optimal beam cross-section is provided hereinbelow.

As each character element on the document page is illuminated its reflection is projected by mirror 14 back through lens 13, a further lens 18, and onto the surface of a linear array 19 of photosensitive elements. Lenses 13 and 18 are both identical lenses, positioned back-to-back to provide a focussed image at array 19. Prism 12 is disposed between lenses 13 and 18 and may be secured directly to lens 13 or otherwise supported between the lenses. Prism 12 intercepts an insignificantly small portion of the reflected image because the prism is small relative to lenses 13 and 18 and it is located in the parallel field area between the lenses where the reflected character image is relatively dispersed.

The photosensitive elements in array 19 are arranged in a straight line, each element having a precise location. The reflected character slice image projected onto the array appears as a darkened region of an illuminated area. The pattern produces a corresponding pattern of electronic signals. The signal pattern is assembled in the processor with other patterns to construct a complete character to be recognized. This character is then electronically compared, by well-known techniques, with standard character configurations to ascertain the identity of the character being scanned. In this regard the dimension of the laser beam cross-section should be large enough to assure that all of the array elements not falling in the darkened region of the projected character slice are in fact included in the projected illuminated area. If such were not the case, those array elements not falling within the illuminated area would erroneously indicate the presence of a part of the reflected character slice image and probably result in a non-recognition condition.

Document page 16 is substantially planar rather than cylindrical about axis A-A' to permit the machine to remain simple and compact. By virtue of this fact the distance between the mirror 14 and successively scanned characters changes with scan angle. To minimize this change, axis 17 is oriented substantially coplanar with the longitudinal centerline of page 16. The distance between the mirror and the illuminated character is therefore a minimum when the mirror is at the middle of its scan interval (i.e. — at the center of the page) and a maximum at the beginning and end of the interval (i.e. — at the edges of the page). The maximum distance is significantly less than would be the case if axis 17 were positioned over the edge of the paper, for example. Nevertheless, the variation in distance between the mirror and illuminated character, as a function of scan angle, must be compensated for in order to assure proper focusing of each illuminated character on the array. To this end, lens 18 is translated along axis A-A' as a function of mirror scan angle. The means for effecting the translation is described herein in detail with reference to FIG. 6.

The foregoing description of the arrangement of FIG. 1 makes no mention of the relative angle between the plane of document page 16 and axis 17. For certain relatively limited applications this angle may be zero, meaning the axis 17 and page 16 are parallel. For most applications, however, page 16 must be tilted slightly relative to axis 17 in order that specular reflections from the page do not reach array 19. Specifically, when axis 17 and page 16 are parallel, during the mid-portion of the mirror scan, the laser beam is reflected directly back at the mirror, along the normal line between the page and the mirror. Consequently, even the darkened characters provide a reflected glare which cannot be distinguished by the array elements from non-character portions of the reflection. By tilting the page slightly about an axis perpendicular to mirror scan axis 17 (i.e. — an axis parallel to a scanned line) these specular reflections are avoided and reliable recognition is permitted. A tilt of approximately 10° is adequate for this purpose. This is readily effected by proper orientation of the document page support surface (not shown).

An undesirable by-product of tilting document page 16 relative to axis 17 is the skewing of the projected character element images relative to array 19. The skew varies as a function of mirror angle and is best illustrated diagrammatically in FIG. 2. In that figure mirror 14 is depicted as viewed from array 19, the projected image of tilted page 16 being designated by the reference numeral 16'. While only one character slice image is projected onto array 19 at a time, for ease in illustration of the skew phenomenon representative illumination patterns 21–33, corresponding to positions across a single line being scanned are illustrated side by side. These patterns project back to array 19 as parallel lines due to the reciprocal nature of the optical system. To further illustrate the skew phenomenon, the characters are assumed to be vertical lines of equal length on page 16, as illustrated in FIG. 1. As described in detail below, these parallel lines appear rotated or skewed, at array 19, in a direction opposite that at the illuminated areas on the document page.

When mirror 14 is at the center of its scan interval it illuminates a slice of character 27' which is projected in somewhat foreshortened from onto array 19. The foreshortening is due to the 10° tilt of page 16 relative to axis 17. The length of the foreshortened character slice may be represented as $x \cos 10°$, where $x$ is the height of printed character 27' on page 16. Importantly, the image of the slice of character 27' is not skewed during projection onto array 19 because the slice of character 27' and axis 17 are co-planar.

On either side of center-scan position, the projected character image is skewed (i.e. — rotated about axis A-A') to a degree dependent upon the scan angle. Thus characters 21' and 33' at opposite ends of the scanned line have their images skewed to the greatest extent, while each intermediate character has its image skewed to a lesser extent depending upon its displacement from the longitudinal center of the page. The skewing of the character image at the array changes the pattern of array elements which remain non-illuminated by the projected character. Thus, instead of seeing a vertical line, the array sees a slanted line, the slant depending upon the current scan angle of the mirror. The processing circuits are therefore unable to properly identify the projected slices or elements of the scanned character. To solve this problem, array 19 is rotated about axis A-A' in synchronization with the mirror scan. The means for effecting this rotation is described subsequently with reference to FIG. 6. The effect, however, tends to position the array to negate the effects of the skewing.

The angular relationship between mirror scan and array rotation may be computed from the simplified schematic representation in FIG. 3. Mirror 14 is illustrated in each of its two extreme scan positions from which it has been rotated through an angle $\pm\phi$ relative to its center position. The resulting scan angle is $\pm\theta$ and corresponds to the angular displacement between center character 27 and each of characters 21 and 33 relative to mirror axis 17. Since the laser beam always approaches mirror 14 along axis A-A' (see FIG. 1), an angular rotation of $x°$ by mirror 14 about axis 17 produces $x°$ change in both the angle of incidence and the angle of reflection. Consequently, the scan angle $\theta$ varies as twice the mirror angle $\phi$, or $\theta = 2\phi$.

Still referring to FIG. 3, line 35 represents a typical vertical scanned slice on tilted page 16. The length of line 35 is indicated as 0.006 N, where N is the number of photosensitive elements in array 19. For N = 60 the total height of the scanning area is 0.36 inches, with each array element "looking at" 0.006 inches of the character height.

The maximum distance between a scanning element or slice on document page 16 and the projection of that element of slice on a hypothetical plane disposed parallel to scan axis 17 and intersecting page 16 at one end of the element or slice may be represented as 0.006 N sin 10°, as illustrated in FIG. 3. Each of lines 21'', 27'' and 33'' represent the projections of lines 21', 27' and 33', respectively, by mirror 14. Each of lines 21'', 27'' and 33'' is a function of $\theta$. Line 27', of course, has a 0° skew (i.e. – 27'' = 0), whereas maximum skew occurs in lines 21' and 33'. A measure of maximum skew is therefore represented by the distance $e$ which in turn can be represented as follows:

$$e = 0.006\ \mathrm{N} \sin 10° \tan\theta. \tag{1}$$

Lenses 13, 18 of FIG. 1 are represented schematically as a block in FIG. 3 and reduce the distance e by some attenuation factor to a distance $e'$. For present purposes it is assumed that this attenuation factor is 5/6. Therefore, $$e' = 5/6\ e \tag{2}$$

and is a measure of the skew of each vertical character slice at the array.

Still referring to FIG. 3, $\alpha$ represents the maximum angle of rotation for array 19 to compensate for the skewing of the characters 21' and 33' on tilted page 16. This angle is computed with the aid of distance $e'$ as projected on the array. The length of the un-skewed projected character slice at the array, with no tilt at page 16, is 0.005N, due to the reduction by lens system 13, 18. The 10° tilt of page 16 foreshortens the character to a length of 0.005N cos 10° (in inches). The array 19 is tilted 10° from perpendicular to the optical axis to maintain sharp focus from top to bottom of a slice, thus compensating for the 10° tilt of page 16; thus the length of the image at array 19 is 0.005N. $\alpha$, the angle of skew of the projected character slice, therefore, is determined by:

$$\alpha = \sin^{-1} (e')/(0.005\mathrm{N} \cos 10°). \tag{3}$$

Utilizing equations (1) and (2) to replace $e'$:

$$\alpha = \sin^{-1} 5/6 \cdot (0.006\ \mathrm{N} \sin 10° \tan\theta)/(0.005\ \mathrm{N} \cos 10°). \tag{4}$$

Reducing terms by trigonometric identities yields:

$$\alpha = \sin^{-1} \tan 10° \tan\theta \tag{5}$$

If the maximum value of $\theta$, which depends upon the distance between mirror 14 and page 16, is 15°, then $\alpha$ is approximately 2.7°. In other words, as the mirror angle $\phi$ ($\phi = ½\,\theta$) rotates through an angle of 7.5°, the array must rotate through an angle of 2.7° to fully compensate for the skew of the projected character. Even though $\alpha$ varies as a function of the tangent of $2\phi$, the linkage between the mirror drive and array drive may be linear; this is true because the tangent function is reasonably linear at the small angles under consideration. To this end, the relationship between $\alpha$ and $\phi$ may be approximated as $\alpha \approx (\tan 10°)(2\phi)$, or simplified as $\alpha \approx 0.352\phi$.

Figure 4:
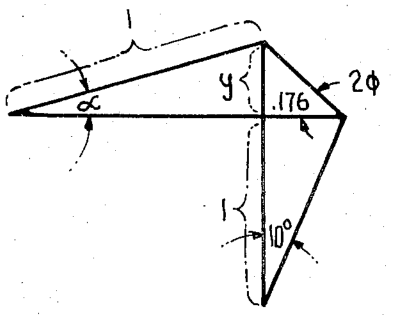
FIG. 4 is a trigonometric diagram illustrating how the array angle of rotation varies with the mirror scan angle.

The relationship between $\alpha$ (the array angle) and $\phi$ (the mirror angle) is graphically depicted in FIG. 4. As $\phi$ varies, leg $y$ increases or decreases correspondingly, producing variations in $\alpha$. As represented $\alpha = \sin^{-1} y$; and since $y = \tan 10° \tan 2\phi$, then $\alpha = \sin^{-1} \tan 10° \tan 2\phi$ (see equation (6)).

In rotating array 19, an additional factor must be considered. While the character slice as projected onto the array is skewed in the course of projection, the laser beam, which is projected onto page 16 and back to the array along a single optical path, is not skewed. Consequently, rotation of the array tends to move certain array elements out of the projected laser beam. The danger in this is that the out-of-beam elements are darkened and therefore are registered in the processing circuit as portions of a projected character slice. So, it is desirable to rotate the array as little as possible but still compensate for character image skew. The processing circuit can tolerate ± ¼ element misalignment in the array; that is, if a photosensitive element is supposed to be dark for the projected character slice, proper processing will ensue if at least 75 percent of that element is dark. This permits a reduction of the array angle of rotation to 75 percent of that needed to provide complete compensation for angle skew. This reduction is sufficient to maintain the array within the projected laser beam reflection. Thus, the maximum angle of array rotation, as corrected, would be $¾ \times 2.7° = 2.0°$. The approximate linear relation between $\alpha$ and $\phi$ is similarly affected so that $\alpha = ¾ \times 0.352\phi = 0.264\phi$.

It is also possible to variably rotate the light beam at lens arrangement 11 as a function of mirror angle. The complexity of such an approach, however, renders compensation by reduced array rotation more desirable.

Figure 6:
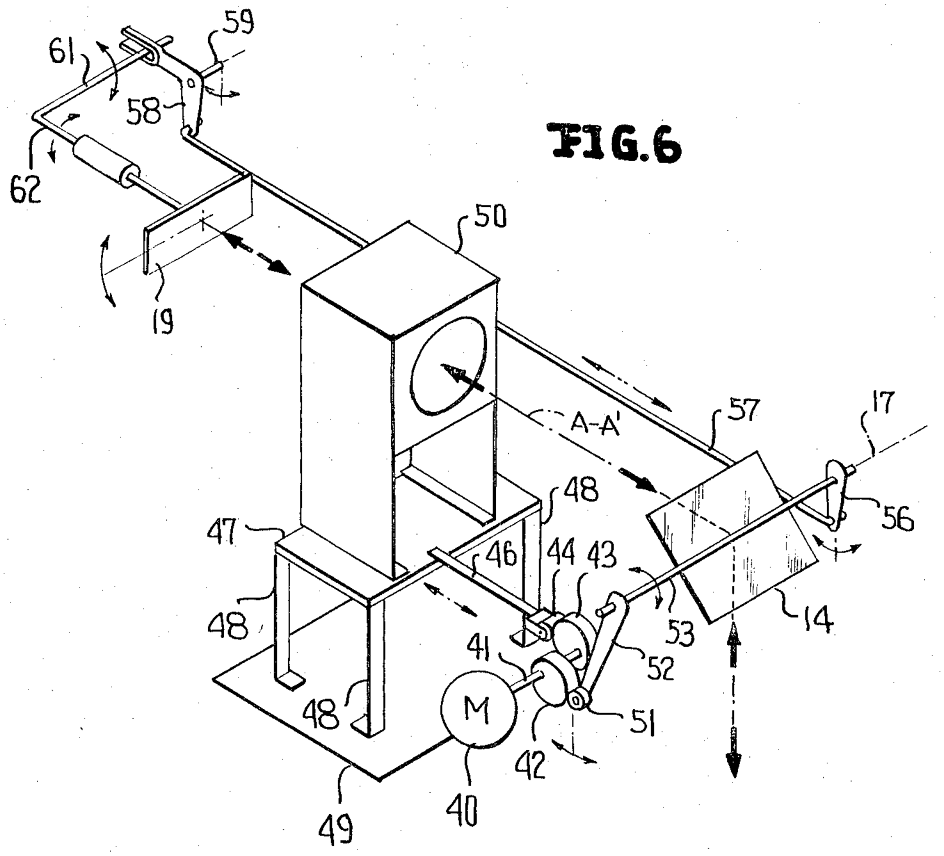
FIG. 6 is a diagrammatic illustration of a mechanical drive for use in arrangement of FIG. 1.

The mechanism for rotating and translating the various components in the system is illustrated schematically in FIG. 6. Specifically, a motor includes a drive shaft 41 which rotates about its axis and has secured thereto a pair of cams 42, 43.

As cam 43 rotates it drives a cam follower 44 secured at one end of a horizontally extending arm 46. The other end of arm 46 is secured to a table comprising a flat horizontal panel 47 supported at its corners by four upstanding flexure legs 48 of equal length. Legs 48 are secured at their bottom ends to a flat horizontal support surface 49. A mount 50 for lens 18 is secured to the top surface of panel 47.

Legs 48 are flexible in the direction of translation of arm 46 by cam 43. This direction is parallel to axis A-A' of FIG. 1, so that lens 18 in holder 50 can be translated along that axis. Importantly, the four upper ends of flexure legs 48 define a plane at all times because all four legs are always flexed to the same degree. Moreover, this plane, on which panel 47 rests, is always horizontal, regardless of the degree of flexure of legs 48. Thus translation of lens 18 along axis A-A' is effected without tilting the image projected by lens 18 onto array 19.

Cam 42 drives a cam follower 51 secured at one end of a pivot arm 52 which is disposed perpendicular to the axis 17 about which mirror 14 rotates. The other end of pivot arm 52 is fixedly secured to a shaft 53 disposed along axis 17 and secured to the back of mirror 14. As cam 42 rotates, pivot arm 52 pivots about axis 17 and rotates shaft 53, thereby producing the necessary scanning motion of mirror 14.

One end of a linkage arm 56 depends from and is secured to shaft 53 such that arm 56 pivots about axis 17 as shaft 53 rotates. A rod 57 is journaled at one end in the other end of arm 56 and extends in a direction generally parallel to optical axis A-A' of FIG. 1. The other end of push rod 57 is journaled at one arm of a bell crank 58 which is pivotable in a plane parallel to optical axis A-A' about a horizontal axis 59. The other arm of bell crank 58 engages one leg 61 on an L-shaped rod, the other leg 62 of which extends along optical axis A-A'. Leg 62 is constrained by bushing 63 or the like so that it cannot move perpendicular to the optical axis A-A' but can rotate about that axis. The remote end of leg 62 is secured to array 19 which is thereby forced to rotate about axis A-A' with leg 62.

As mirror drive shaft 53 rotates under the influence of cam 42, rod 57 is tranlated parallel to axis A-A'. This translation rotates bell crank 58 which raises or lowers the remote end of leg 61 of the L-shaped rod. This in turn causes leg 62 of that rod to rotate array 19 about optical axis A-A'.

In the manner described above, motor 40 serves as the sole drive source for mirror 24, lens 18 and array 19. The configurations of cams 42 and 43 are chosen to provide the functional relationships described in relation to FIGS. 1–5 for the driven components. Specifically, cam 42 is contoured in two, or possibly three sections. In one section, corresponding to the scan interval for mirror 14, the cam is configured according to a tangent function to provide a linear mirror sweep across the document page. In a second section cam 42 is contoured to provide a quick return of the mirror to its starting scan position. A third section of cam 42, which may or may not be provided, produces a dwell interval wherein the mirror remains at its start scan (or end scan) position for a predetermined time interval. Rotation of array 19 follows rotation of mirror 14 in a linear manner.

Figure 5:
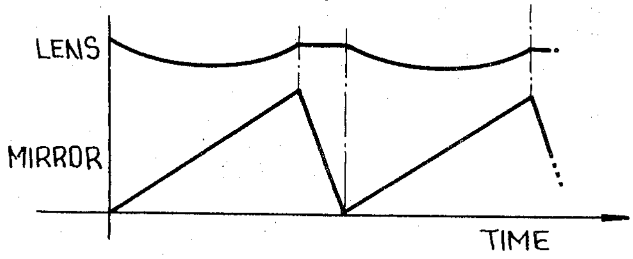
FIG. 5 is a plot of both scan angle and lens translation as a function of time, illustrating the lens translation necessary to correct focal length as a function of scan angle.

Cam 43 is configured according to the relationship illustrated graphically in FIG. 5 wherein translation of lens 18 and rotation of mirror 14 are illustrated as a function of time. It is assumed, for purposes of FIG. 5, that no dwell time is provided in the mirror scan cycle. Lens 18 is translated at maximum velocity toward the beginning and end of the mirror scan cycle. At the center of the scan cycle, the velocity of lens 18 is substantially zero. And since the mirror is positioned with axis 17 over the longitudinal center of the document page, the two halves of the lens translation cycle are symmetrical, as illustrated in FIG. 5. Therefore panel 47 may be positioned at its quiescent position, with legs 48 unflexed, at the start of a mirror scan interval. Cam 43 is configured to push panel 47 at maximum once the scan interval begins and gradually reduce the velocity as the scan interval proceeds towards its mid-portion. Beyond the mid-portion of the scan cycle cam 43 permits the panel to return towards its quiescent position at a gradually increasing vlocity. A considerable dwell is provided in cam 43 to permit mirror 14 to return to its start scan. This dwell in the cycle of lens 18 may be extended if the mirror cycle includes a dwell.

The details of a practical optical arrangement have been described above; however the broad concepts of the present invention may be embodied by other arrangements. Importantly, the present system utilizes a common scanning optical path to project a light beam onto a page and to project a reflected illuminated character to a photosensitive array. This approach facilitates illumination of one character sample at a time by using a simple scanning arrangement.

While we have described and illustrated one specific embodiment of our invention, it will be clear that variations of the details of construction which are specifically illustrated and described may be resorted to without departing from the true spirit and scope of the invention as defined in the appended claims.

We claim:

1. In an optical character reading machine of the type intended to read plural characters arranged in at least one line extending along the width of a flat document by examining successive vertical slices of each character in turn while said document is motionless relative to said machine, apparatus including:

source means for generating a light beam having a height in cross-section approximately the size of the maximum height of each of said characters and having a width in cross-section which is considerably narrower than the width of each of said characters;

means for projecting said light beam along a first axis;

a first optical path extending between said means for projecting and said characters and partially along said first axis, said first optical path including a single-surface scanning mirror positioned to reflect said light beam onto said characters;

means for cyclically rotating said scanning mirror about a second axis to sweep said projected beam width-wise across said document such that successive vertical slices of each character in said line are successively illuminated, said second axis being positioned to define an imaginary plane with the longitudinal center line of said document, which plane has a substantially perpendicular intersection with said document, thereby centering said second axis relative to the document so that variations in distance between the mirror and an illuminated slice are minimized during cycles of said mirror;

optical image sensing means; and a second optical path extending from said characters and terminating at said optical image sensing means, said second optical path including said scanning mirror and said first optical path and further comprising means for accurately imaging each illuminated character slice onto said optical image sensing means.

2. In an optical character reading machine of the type intended to read plural characters arranged in at least one line extending along the width of a flat document by examining successive vertical slices of each character in turn, apparatus including:

source means for generating a light beam having a height in cross-section approximately the size of the maximum height of each of said characters and having a width in cross-section which is considerably narrower than the width of each of said characters;

means for projecting said light beam along a first axis;

a first optical path extending between said means for projecting and said characters and partially along said first axis, said first optical path including a single-surface scanning mirror positioned to reflect said light beam onto said characters;

means for cyclically rotating said scanning mirror about a second axis to sweep said projected beam width-wise across said document such that successive vertical slices of each character in said line are successively illuminated, said second axis being positioned to define an imaginary plane with the longitudinal center line of said document, which plane has a substantially perpendicular intersection with said document;

optical image sensing means; and a second optical path extending from said characters and terminating at said optical image sensing means, said second optical path including said scanning mirror and said first optical path and further comprising means for accurately imaging each illuminated character slice onto said optical image sensing means;

wherein said means for accurately imaging includes a lens arrangement and means synchronized to said drive means for varying the focal distance of said lens arrangement as a function of the mirror scan angle to focus each illuminated character slice on said optical image sensing means.

3. The apparatus according to claim 2 wherein the plane of said document is disposed at an angle of approximately 10° relative to said second axis to eliminate specular reflection from said character slices along said second optical path.

4. The apparatus according to claim 3 wherein said apparatus further comprises means synchronized to said drive means for rotating said optical image sensing means about said second optical path as a function of mirror scan angle to at least partially compensate for skewing of character images at said optical image sensing means resulting from the angle formed between said second axis and said document.

5. The apparatus according to claim 4 wherein said means for rotating said optical image sensing means includes means for limiting such rotation to assure that the illuminated image reflected along said second optical path always extends over the entire optical image sensing means.

6. The apparatus according to claim 5 wherein said source means includes a relatively low power laser for generating said light beam, and beam-forming means to configure the cross-section of said light beam to the configuration necessary to illuminate a vertical character slice.

7. The apparatus according to claim 2 wherein said means for projecting comprises a small light-reflecting element positioned on said first axis to direct said light beam along said first optical path toward said scanning mirror, said element being positioned relative to said lens arrangement so as to intercept an insignificant part of the image reflected along said second optical path.

8. The apparatus according to claim 2 wherein said lens arrangement comprises a pair of condensing lenses arranged back-to-back along said first axis, and wherein said means for varying the focal length includes means for translating at least one of said lenses along said first axis as a function of the mirror scan angle.

9. The apparatus according to claim 8 wherein said means for projecting comprises a small light-reflecting element positioned on said first axis to direct said light beam along said first optical path toward said scanning mirror, said element being positioned between said two lenses at a location in which it intercepts an insignificantly small portion of the illuminated image reflected along said second optical path.

10. In an optical character reading machine of the type intended to read characters arranged in at least one line by examining successive vertical slices of each character in turn, apparatus including:

source means for generating a light beam having a height in cross-section approximately the size of the maximum height of each of said characters and having a width in cross-section which is considerably narrower than the width of each of said characters;

means for projecting said light beam along a first axis;

a first optical path extending between said means for projecting and said characters and partially along said first axis, said first optical path including a single-surface scanning mirror positioned to reflect said light beam onto said characters;

drive means for rotating said scanning mirror about a specified axis to sweep said projected beam width-wise across said document and said line of characters such that successive vertical slices of each character in said line are successively illuminated, said scanning mirror being positioned such that said second axis forms an angle of approximately 10° with said document;

optical image sensing means;

a second optical path extending from said characters and terminating at said optical image sensing means, said second optical path including said scanning mirror and said first optical path and further comprising means for accurately imaging each illuminated character slice onto said optical image sensing means; and means synchronized to said drive means for rotating said optical image sensing means about said second optical path as a function of mirror scan angle to at least partially compensate for skewing of character slice images at said optical image sensing means resulting from the angle formed between said second axis and said document.

11. The apparatus according to claim 10 wherein said means for rotating said optical image sensing means includes means for limiting such rotation to assure that the illuminated image reflected along said second optical path always extends over the entire optical image sensing means.

12. The apparatus according to claim 10 wherein said means for accurately imaging includes a lens arrangement and means synchronized to said drive means for varying the focal distance of said lens arrangement as a function of the mirror scan angle to focus each illuminated character slice on said optical image sensing means.

13. The apparatus according to claim 12 wherein said means for projecting comprises a small light-reflecting element positioned on said first axis to direct said light beam along said first optical path toward said scanning mirror, said element being positioned relative to said lens arrangement so as to intercept an insignificant part of the image reflected along said second optical path.

14. The apparatus according to claim 12 wherein said lens arrangement comprises a pair of condensing lenses arranged back-to-back along said first axis, and wherein said means for varying the focal length includes means for translating at least one of said lenses along said first axis as a function of the mirror scan angle.

15. The apparatus according to claim 14 wherein said means for projecting comprises a small light-reflecting element positioned on said first axis to direct said light beam along said first optical path toward said scanning mirror, said element being positioned between said two lenses at a location in which it intercepts an insignificantly small portion of the illuminated image reflected along said second optical path.

16. The method of optically reading characters disposed in at least one line along a flat surface, said method comprising the steps of:

generating a light beam of known cross-section, said known cross-section having a height which is approximately equal to the height of said characters and a width which is a small fraction of the width of said characters;

projecting said light beam along a first movable path which strikes said surface at an angle of approximately 10° from normal and which sweeps across and individually illuminates successive vertical slices of characters in said line;

reflecting each illuminated character slice back along said first path;

accurately imaging the reflected slices on an optical sensing apparatus; and rotating said optical sensing apparatus relative to the reflection path of said reflected slices and in synchronization with the sweep position of said light beam to at least partially compensate for skewing of reflected character slices resulting from the angle at which said light beam strikes said surface.

* * * * *